July 12, 1966
JAMES E. WEBB
ADMINISTRATOR OF THE NATIONAL AERONAUTICS
AND SPACE ADMINISTRATION
WIND-TUNNEL MICROPHONE STRUCTURE
Filed July 25, 1962
3,260,326
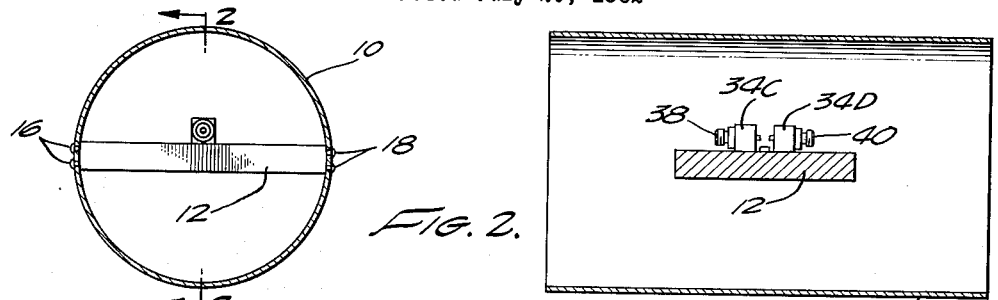
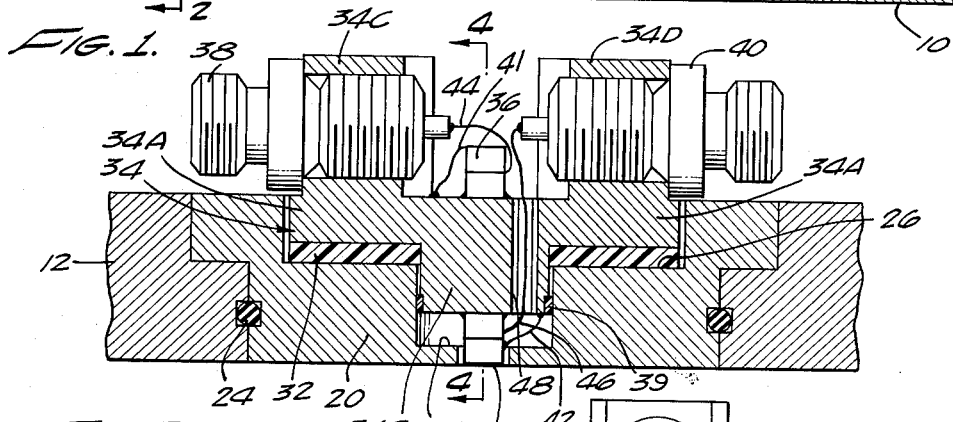
WILLIAM S. CHEN
SAMUEL WHEELER
INVENTORS
BY
ATTORNEY

3,260,326
WIND-TUNNEL MICROPHONE STRUCTURE
James E. Webb, Administrator of the National Aeronautics and Space Administration, with respect to an invention of William S. Chen and Samuel Wheeler
Filed July 25, 1962, Ser. No. 212,497
6 Claims. (Cl. 181—.5)

This invention relates to microphone apparatus for measuring sound and pressure in an acoustical environment and, more particularly, to improvements therein.

When a microphone is used as a sensing element for measuring sound and/or pressure in an acoustical environment, such as a wind tunnel, problems in obtaining accurate measurements arise due to the fact that the support for the microphone, which is supported from the wind-tunnel walls, causes signals to arise in the microphone as a result of the vibrations communicated from the wind-tunnel walls. Extraneous noise is also present in the wind tunnel and interferes with obtaining the proper signal outputs from the microphone.

It is an object of this invention to provide apparatus for supporting a microphone in an acoustical environment, which minimizes the effects of vibrations which are transmitted to said support apparatus.

Another object of the present invention is the provision of a unique microphone arrangement for minimizing the effects of unwanted signals in the microphone output.

Still another object of the present invention is the provision of a novel microphone arrangement and support for measuring the random-fluctuating loads on a solid surface, which are created by airflow past such solid surface.

These and other objects of the present invention may be achieved by employing two microphones which are mounted back-to-back on opposite sides of a plate. One of these microphones is mounted to be flush with the surface of the plate which is exposed to the airflow of a wind tunnel. The other microphone is protected from the wind tunnel airflow. The mounting support for the microphone is shock-mounted by suitable means with respect to the remainder of the metal plate. The remainder of the metal plate is supported by a suitable arrangement, so that the microphones are positioned at the location at which measurements are to be made. Accordingly, both microphones are positioned in the acoustical environment in which the measurements are to take place in a manner so that one of them is exposed to both desired and undesired signal-generating forces, and the other is exposed only to the undesired signal forces. The outputs of the two microphones are then connected to a difference amplifier, where the two microphone outputs oppose one another. The resultant output of the difference amplifier consists of signals desired to be measured without the presence of extraneous signals.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a drawing showing the appearance of an embodiment of the invention mounted in a wind tunnel;

FIGURE 2 is a sectional view along the lines 2—2 of FIGURE 1;

FIGURE 3 is an enlarged view of the cross-sectional view of the embodiment of the invention shown in FIGURE 2;

FIGURE 4 is a cross-sectional view of the appearance of the embodiment of the invention taken along the lines 4—4 of FIGURE 3; and FIGURE 5 is a block diagram showing how the microphones employed, in accordance with this invention, are connected to eliminate undesired signals.

Referring now to FIGURE 1, there is shown how an embodiment of the invention may be mounted for making measurements in a wind tunnel. This is given by way of an illustration of the utility of the embodiment of the invention for measuring sound and noise in an acoustical environment, and is not to be taken as a limitation thereon. Inside of a wind tunnel 10, a mounting plate 12 is supported from both sides of the walls of the wind tunnel by means of bolts 16, 18. As shown in FIGURE 2, which is a sectional view taken along the lines 2—2 of FIGURE 1, the plate extends with a flat surface parallel to the axis of the wind tunnel. It is desired to measure the pressure of the random fluctuating load caused on a solid surface by airflow past the solid surface. It has been found that a turbulent boundary layer is produced by such airflow, which generates both a sound field in the free stream and causes random fluctuating loads on the solid surface.

FIGURE 3 is an enlarged view of the portion of the mounting plate 12, shown in FIGURE 2, within which the transducer, in accordance with this invention, is supported. In order to minimize any effects of the vibration of the walls of the wind tunnel on the microphone array which is used to measure pressures, it is desirable to literally float these microphones in as resilient a mounting or support as possible. A circular opening is first made in the mounting plate 12. This circular opening is counterbored, in order to conform to the step configuration of the outer periphery of an outer circular plate 20. Circular notches are cut in adjacent wall portions of the plate 12 and the outer circular plate 20, to enable an O-ring 24 to be inserted therein for holding the two plates resiliently together. It will be seen that the opposite exposed surfaces of the circular plate 20 and the plate 12 are flush with one another.

The center of the outer circular plate is counterbored to provide two lands, respectively 26, 28. An opening also is provided through the center, through which the sensitive elements of a first microphone 30 may extend to be flush with the surface of the plate.

A neoprene washer 32 is placed on the first land. Inserted into the openings of the outer circular plate and also seated on the neoprene washer 32 is a base member 34, on which respective first and second microphone elements 30, 36 are mounted.

The base member 34 effectively has a first circular portion 34A from the center of which a second smaller circular portion 34B extends far enough from the first circular portion 34A so that the first transducer element 30, when attached thereto by suitable cement, will extend until its outer surface is flush with the surface of the plates 12 and 20. The second circular portion is notched to permit a bushing 38 of a material, such as polystyrene, to be inserted between the walls of the outer circular plate and the second circular portion 34B, in order to damp out any lateral vibrations.

The base member 34 has two spaced extensions, respectively 34C and 34D, which serve the purpose of supporting electrical terminal fittings 38, 40 to enable electrical connection to be made to the active transducer elements, respectively 30, 36. These rectangular extensions 34C, 34D also form a well to protect the microphone 36 from the pressure of the wind in the wind tunnel.

The active transducer elements 30, 36 constitute polarized barium titanate crystals. This material is piezoelectric, and a positive or negative deformation of the crystal produces a positive or negative electric field which can be sensed by voltage measurements. In addition, it has a high dielectric constant and gives a stable output with time. In the embodiment of the invention, by way of example, and not to be construed as a limitation thereon, discs of polarized barium titanate crystals 0.05″ in diameter and 0.04″ thick were used. The surface of the discs were electroded to form a capacitor. The disc size chosen was determined as a compromise for a transducer which would measure the pressure at a point and at the same time would provide an adequate capacity and sensitivity. Because of the small capacitance, actually two discs are stacked together and wired in parallel to increase the capacity of the transducer. Thus, the transducer element 30 actually constitutes two crystals, respectively 30A, 30B, and the transducer element 36 constitutes two crystals, respectively 36A, 36B.

The base member 34 serves as ground, or a common return, for the respective lower crystals 36A and 30A, which are cemented in contact therewith. Wire leads, respectively 41, 42, connect from the respective upper crystals 30B, 36B to the base member 34. A lead 44 is connected from one of the terminal fittings 38 to the junction of the two crystals, 36A, 36B. A lead 46 is brought to the other terminal fitting 40 through an insulating sleeve 48, which extends through a suitable opening in the base member provided therefor. This lead connects to the junction of the two crystals 30A, 30B.

As may be seen in FIGURE 4, which is a view along the lines 4—4, the base member 34 is bolted to the outer circular plate 20 by means of bolts 50, 52. These bolts are inserted into sleeving material, respectively 54, 46, which, by way of example, may be Teflon. The bolts are threaded into the outer circular plate 20 and extend through openings provided for this purpose in the washer 32.

The annular gap around the crystals 30A, 30B and any other included air spaces are sealed with an insulating material, such as liquid cement or paraffin. Similarly, the crystal 36 has all but its active surface so sealed. The O-ring 24 and the washer 32 serve in large measure to isolate the crystal elements from vibration transmitted through the plate 12 from the walls, to which the plate 12 is attached. The plate spans the wind tunnel, and the flush-mounted crystal element is located on the bottom side of the plate. A row of orifices, not shown, may be located near the leading edge of the plate through which a small amount of air can be emitted, to trip the boundary layer. To facilitate testing over a wide range of boundary-layer thicknesses, cutouts to accommodate inserts containing other transducers may be made at positions which are spaced along the plate 12. A system of two to three transducers, spaced one inch apart, for example, can be accommodated in any of three cutout locations. This facilitates testing over a wide range of boundary-layer thicknesses.

The transducers or crystals which are employed in accordance with this invention not only respond to the pressure fluctuations in the boundary layer of air which is passing over the lower surface of the plate, but also to accelerations transmitted from the wind-tunnel structure to the plate in which the transducer is housed. By mounting two identical sets of crystals back-to-back, with a rigid backing in between, and, further, by supporting these crystals in such a way that one set of crystals faces toward and the other set is shielded, or faces away from the airstream, the "active" crystal 30 will pick up both pressure signals as well as acceleration signals, while the "dummy" crystal 36 senses only the acceleration signals.

In accordance with FIGURE 5, an arrangement is shown for obtaining cancellation of the unwanted acceleration signals, so that what is left are the pressure signals. As shown in FIGURE 5, the crystals 30A, 30B and 36A, 36B are connected in parallel. The respective outputs derived by way of the fittings 38, 40 are connected to cathode-follower circuits, respectively 60, 62. The outputs of the cathode-follower circuits are applied to a difference amplifier 64. This subtracts the acceleration signals provided by the dummy crystal from the acceleration and pressure signals provided by the active crystal, as a result of which the active, or desired, signals remain. These may be applied to any suitable measuring circuit 66.

There has accordingly been described herein a novel and useful transducer arrangement wherein two active elements are employed for the transducer, both of which are supported in a manner to substantially float. One of the active elements is exposed to the environment in a manner to produce an output indicative of the quantity to be measured plus unwanted signals. The other active element is exposed in the environment in a manner to produce an output indicative of the unwanted signals. The outputs of both active elements are opposed to one another to produce a resultant comprising solely the wanted signals. In view of the manner of mounting the active elements back-to-back on the same support, both elements respond identically to any unwanted velocity signals. Although this invention has been described in connection with measuring the pressures produced as a result of airflow in a wind tunnel caused by airflow past a solid surface, it will be appreciated by those skilled in the art that this should be construed as a specific illustration of the utility of the embodiment of the invention, and not as a limitation thereon.

We claim:

1. A transducer for measuring sound and noise in an acoustical environment comprising a first and second sensing element, a base member having opposed surfaces and a well formed on one of said opposed surfaces, means for mounting one of said sensing elements within said well, means for mounting the other sensing element at the opposed surface at a location directly opposite to that of said one sensing member mounting, a support member having an opening therein into which the side of said base member not having said well may be inserted, said opening extending through said support member to enable a sensing surface of said other sensing element to extend to the surface of said support member opposite to the one having the opening into which said base member is inserted, means for resiliently supporting said base member within said support member, means for fastening said base member to said support member, and means for opposing the outputs of said sensing members to eliminate unwanted common components thereof.

2. A transducer for measuring sound and noise in an acoustical environment comprising a first and second sound-sensing element, a base member having on one surface spaced extending portions defining a well therebetween and on the other surface of said base member an extension positioned opposite to the location of said well, means for mounting one of said sensing elements in said well and the other of said sensing elements on said extension of said base member, a support member, first opening means in said support member extending from one surface thereof for receiving therein all of said base member except said extension and the other of said sensing elements, second opening means in said support member extending from said first opening means to the surface opposite said one surface of said support member for enabling said other sensing element to extend from said base member to the surface of said support member opposite to the one having the opening for said base member, resilient means interposed between opposite surfaces of said base member and said support member, means for resiliently attaching said base member to said support member, means for holding said support member and base member in an acoustical environment for exposing said sensing element in said well only to undesired acoustical signals and said other sensing element to both desired and undesired acoustical signals, and means for opposing the outputs of both said sensing elements for deriving as a result signals representative of said desired acoustical signals.

3. A transducer as recited in claim 2 wherein said resilient means interposed between surfaces of said base member and support member comprises a washer and a bushing, said bushing being positioned between the sides of the raised central portion of the base member and said washer being positioned on the surface adjacent said raised central portion.

4. The transducer as recited in claim 2 wherein said means for supporting said transducer in said acoustical environment includes a support plate having an opening therein for receiving said support member, and resilient O-ring means for holding said support member and said plate together.

5. The transducer as recited in claim 2 wherein said means for resiliently connecting said base member to said support member comprises an opening extending through said base member, a threaded opening in said support member aligned with said opening in said base member, a bolt having a shank smaller than the opening in said base member and being threadable into the threaded opening in said support member, and a resilient sleeve filling the space between the head of said bolt and the periphery of said shank and the sides of the opening through said base member.

6. The improvement in a transducer for measuring the pressure on a solid surface arising as a result of a turbulent boundary layer produced by airflow past said solid surface comprising a first and second transducer, a flat plate having an opening therein, means for supporting said first transducer within said opening with a sensitive surface thereof flush with the surface of said flat plate and for supporting said second transducer extending from the other side of said means opposite to said first transducer, said means for supporting also including extension members disposed on either side of said second transducer for providing a protective well for said second transducer, a differential amplifier, and means for connecting the outputs of said first and second transducers to said differential amplifier for eliminating undesired components of said acoustical environment from said differential amplifier output.

References Cited by the Examiner
UNITED STATES PATENTS

| | | | |
|---|---|---|---|
| 1,529,520 | 3/1925 | Watkins | 340—16 |
| 2,376,730 | 5/1945 | Steinhoff | 340—6 |
| 2,400,552 | 5/1946 | Hoover | 340—6 |
| 2,444,069 | 6/1948 | Sivian | 340—6 |

BENJAMIN A. BORCHELT, *Primary Examiner.*

CHESTER L. JUSTUS, *Examiner.*

J. W. MILLS, M. F. HUBLER, *Assistant Examiners.*